(12) United States Patent
Ohashi

(10) Patent No.: US 11,045,718 B2
(45) Date of Patent: Jun. 29, 2021

(54) INFORMATION PROCESSING DEVICE, CONTROL METHOD OF INFORMATION PROCESSING DEVICE, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/605,667

(22) PCT Filed: Apr. 18, 2018

(86) PCT No.: PCT/JP2018/016032
§ 371 (c)(1),
(2) Date: Oct. 16, 2019

(87) PCT Pub. No.: WO2018/198910
PCT Pub. Date: Nov. 1, 2018

(65) Prior Publication Data
US 2020/0129850 A1 Apr. 30, 2020

(30) Foreign Application Priority Data
Apr. 28, 2017 (JP) .............................. JP2017-090171

(51) Int. Cl.
*A63F 13/213* (2014.01)
*A63F 13/25* (2014.01)
(Continued)

(52) U.S. Cl.
CPC ............ *A63F 13/213* (2014.09); *A63F 13/25* (2014.09); *A63F 13/52* (2014.09); *A63F 13/533* (2014.09);
(Continued)

(58) Field of Classification Search
CPC ........ A63F 13/213; A63F 13/25; A63F 13/52; A63F 13/533; A63F 13/577; G06F 3/011;
(Continued)

(56) References Cited

U.S. PATENT DOCUMENTS 6,346,929 B1 * 2/2002 Fukushima ............. G06F 3/013
345/156
9,383,895 B1 * 7/2016 Vinayak ............... G06F 3/04883

FOREIGN PATENT DOCUMENTS

| JP | 08-006708 A | 1/1996 |
|---|---|---|
| JP | 2010-034633 A | 2/2010 |

(Continued)

OTHER PUBLICATIONS

International Search Report and Written Opinion dated May 22, 2018, from International Application No. PCT/JP2018/016032, 11 sheets.

(Continued)

*Primary Examiner* — Kenneth B Lee, Jr.
(74) *Attorney, Agent, or Firm* — Katten Muchin Rosenman LLP

(57) ABSTRACT

An information processing device obtains information regarding the position of each fingertip of a user in a real space, and determines contact between a virtual object set within a virtual space and a finger of the user. The information processing device sets the virtual object in a partly deformed state such that a part of the virtual object, the part corresponding to the position of the finger determined to be in contact with the object among the fingers of the user, is located more to a far side from a user side than the finger, and displays the virtual object having the shape set thereto as an image in the virtual space on a display device.

10 Claims, 5 Drawing Sheets

(51) Int. Cl.
*A63F 13/52* (2014.01)
*A63F 13/533* (2014.01)
*A63F 13/577* (2014.01)
*G06F 3/01* (2006.01)
*G06T 19/00* (2011.01)
*G09G 5/36* (2006.01)
*G06F 3/0482* (2013.01)
*G06F 3/0484* (2013.01)

(52) U.S. Cl.
CPC ............ *A63F 13/577* (2014.09); *G06F 3/011* (2013.01); *G06T 19/006* (2013.01); *G09G 5/36* (2013.01); *A63F 2300/1087* (2013.01); *A63F 2300/308* (2013.01); *A63F 2300/643* (2013.01); *A63F 2300/66* (2013.01); *G06F 3/0482* (2013.01); *G06F 3/0484* (2013.01); *G09G 2354/00* (2013.01)

(58) Field of Classification Search
CPC ... G06F 3/0482; G06F 3/0484; G06T 19/006; G09G 5/36
See application file for complete search history.

(56) References Cited

FOREIGN PATENT DOCUMENTS

| | | | | |
|---|---|---|---|---|
| JP | 2010146481 A | * | 7/2010 | ........... G02B 27/017 |
| JP | 2011-198150 A | | 10/2011 | |
| JP | 2011198150 A | * | 10/2011 | |
| JP | 2012-194492 A | | 10/2012 | |
| JP | 2012-252386 A | | 12/2012 | |
| JP | 2014-192838 A | | 10/2014 | |
| JP | 2014192838 A | * | 10/2014 | |
| WO | 2010073928 A1 | | 7/2010 | |
| WO | 2015/030264 A1 | | 3/2015 | |

OTHER PUBLICATIONS

V. I. Pavlovic, et. al., "Visual interpretation of hand gestures for human-computer interaction: a review," IEEE Transaction on Pattern Analysis and Machine Intelligence, vol. 19, No. 7, pp. 677-695, 1997.

Noriaki Fujishima, et. al., "Fingernail Detection Method from Hand Images including Palm," Proceedings of IAPR International Conference on Machine Vision Applications, pp. 117-120, 2013 or the like).

International Preliminary Report on Patentability dated Nov. 7, 2019, from International Application No. PCT/JP2018/016032, 18 sheets.

* cited by examiner

INFORMATION PROCESSING DEVICE, CONTROL METHOD OF INFORMATION PROCESSING DEVICE, AND PROGRAM

TECHNICAL FIELD

The present invention relates to an information processing device, a control method of the information processing device, and a program.

BACKGROUND ART

Devices that are mounted on the head of a user and display information, such as head-mounted displays and the like, have spread in recent years. Of such devices, there is a device that makes the user visually recognize a stereoscopic image by presenting virtual images as viewed from different positions to a left eye and a right eye of the user.

In addition, this device also presents a menu as one virtual image to the user, and receives a selection by the user.

SUMMARY

Technical Problems

However, in a conventional menu selection, the user performs an operation of making a selection from the menu by using a separate device including physical buttons such as a game controller or the like. In addition, it is possible to detect the inclination, position, or the like of the device, move a cursor displayed as a virtual image according to the inclination, moving direction, or amount of movement of the device, and allow a selection to be made from the menu. In any case, however, the user cannot perform such an operation as to directly touch a virtual menu object being displayed, and cannot be made to perform the operation without a feeling of strangeness.

The present invention has been made in view of the actual situation described above, and it is an object of the present invention to provide an information processing device, a control method of the information processing device, and a program that enable operations related to a virtually displayed image such as a menu or the like to be performed without a feeling of strangeness.

Solution to Problems

According to the present invention for solving the problems of the above-described related art example, there is provided an information processing device connected to a display device presenting an image of a virtual space to a user. The information processing device includes: obtaining means for obtaining information regarding a position of each fingertip of the user in a real space; object setting means for setting a position and an image of a virtual object within the virtual space; determining means for determining contact, between the virtual object set within the virtual space and a finger of the user; and shape setting means for setting the virtual object in a partly deformed state such that a part of the virtual object, the part corresponding to a position of the finger determined to be in contact with the object among fingers of the user, is located more to a far side from a user side than the finger. The virtual object has the shape set to the virtual object being displayed as an image in the virtual, space on the display device.

Advantageous Effect of Invention

According to the present invention, operations related to a virtually display image such as a menu or the like can be performed without a feeling of strangeness.

DESCRIPTION OF EMBODIMENT

Figure 1:
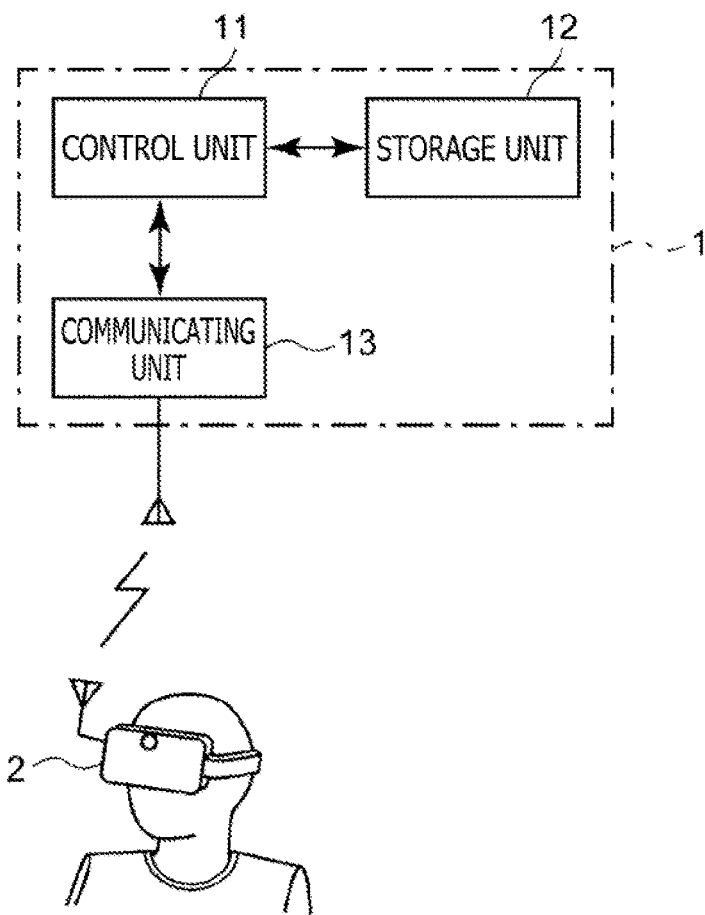
FIG. 1 is a block diagram depicting an example of a configuration of an information processing device according to an embodiment of the present invention.

An embodiment of the present invention will be described with reference to the drawings. As illustrated in FIG. 1, an information processing device 1 according to the embodiment of the present invention includes a control unit 11, a storage unit 12, and a communicating unit 13. In addition, the information processing device 1 is communicatably connected to a display device 2 such as a head-mounted display (HMD) worn on a head of a user or the like.

Figure 2:
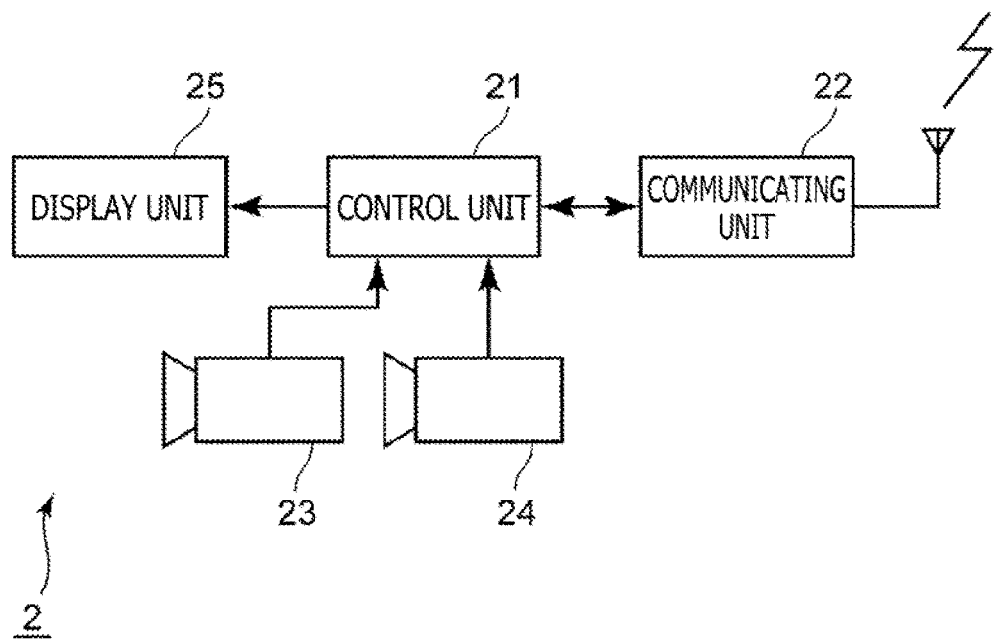
FIG. 2 is a configuration block diagram depicting an example of a display device connected to the information processing device according to the embodiment of the present invention.

The display device 2 may be, for example, a transmissive HMD that presents images of a real space and a virtual space in a superimposed state (in a semitransparently synthesized state) to the user wearing the display device 2, or may be a non-transmissive HMD that displays an image of a virtual space. An example of the display device 2 is a display device worn and used on the head of the user, and includes a control unit 21, a communicating unit 22, an imaging unit 23, a depth camera 24, and a display unit 25, as illustrated in FIG. 2. The control unit 21 of the display device 2 in the example here is a program control device such as a microcomputer or the like. The control unit 21 operates according to a program stored in a memory not depicted in the figure such as an internal storage unit or the like, and displays video according to information input from the information processing device 1 via the communicating unit. 22 on the display unit 25 to make the user view the video.

The communicating unit 22 is communicatably connected to the information processing device 1 by wire or by wireless. The communicating unit 22 sends out, to the information processing device 1, image data obtained by imaging by the imaging unit 23 to be described later and depth information output by the depth camera 2A to be described later. In addition, the communicating unit 22 outputs, to the control unit 21, information transmitted from the information processing device 1 to the display device 2.

The imaging unit 23 is a camera or the like. The imaging unit 23 repeatedly images an image of the real space within a predetermined field of view in front of the user (in front of the head), and sends out image data obtained by the imaging to the information processing device 1 via the communicating unit 22.

The depth camera 24 detects, for each pixel included in the image within the field of view imaged by the imaging unit 23, a distance to an object imaged within the pixel, and outputs depth information (depth map) indicating the detected distance for each pixel. Specifically, a widely known depth camera that projects infrared rays and measures a distance to an object, for example, car, be used as the depth camera 24.

Suppose that the display unit 25 displays video corresponding to a right eye and a left eye of the user in front of the respective eyes. The display unit 25 includes a display element such as an organic electroluminescence (EL) display panel, a liquid crystal display panel, or the like. The display element displays the video according to an instruction input from the control unit 21. The display element may be one display element that displays the video for the left eye and the video for the right eye in a state of being arranged in one row, or may be a pair of display elements that respectively display the video for the left eye and the video for the right eye independently of each other. Incidentally, the display device 2 in the present embodiment is a transmissive display device, which allows the user to visually recognize the state of the outside world.

Here, the control unit 11 is a program control device such as a central processing unit (CPU) or the like. The control unit 11 executes a program stored in the storage unit 12. In the present embodiment, the control unit 11 executes an application program such as a game application or the like, and performs the following processing.

The control unit 11 detects the position of each fingertip of the user in the real space and the orientation of each finger of the user in the real space (whether each finger is showing a back thereof to the user side or is showing a pad thereof to the user side) on the basis of the image data obtained by the imaging by the imaging unit 23, the image data being output by the display device 2, and obtains information indicating the position of each fingertip and the orientation of each finger.

In addition, the control unit 11 sets information regarding a virtual space. Specifically, the control unit 11 sets a position and an image of a virtual object within a predetermined virtual space, and determines contact between the virtual object set within the virtual space and a finger of the user. The control unit 11 further sets the virtual object in a partly deformed state such that a part of the virtual object, the part corresponding to the position of a finger showing a back thereof among the fingers of the user and determined to be in contact with the object, is located on a farther side from the user side than the finger.

Detailed operation of the control unit 11 will be described later. Incidentally, in the following example, the virtual object displayed here, and determined to be in contact with the finger of the user and deformed will be referred to as a target virtual object to be distinguished from another virtual object (for example, a virtual object not determined to be in contact with the finger of the user nor deformed, such as a virtual object disposed so as to correspond to an object in the real space or the like).

The storage unit 12 is a memory device such as a random access memory (RAM) or the like, a disk device, or the like. The storage unit 12 stores a program executed by the control unit 11. In addition, the storage unit 12 operates also as a work memory for the control unit 11, and stores data used by the control unit 11 in a process of executing the program. This program may be stored and provided on a computer readable and non-transitory recording medium, and then stored in the storage unit 12.

The communicating unit 13 is communicatably connected to the display device 2 of the user by wire or by wireless. The communicating unit 13 receives the image data output by the display device 2, and sends out the image data to the control unit 11. In addition, the communicating unit 13 receives information including image data to be transmitted from the control unit 11 to the display device 2, and outputs the information to the display device 2.

Figure 3:
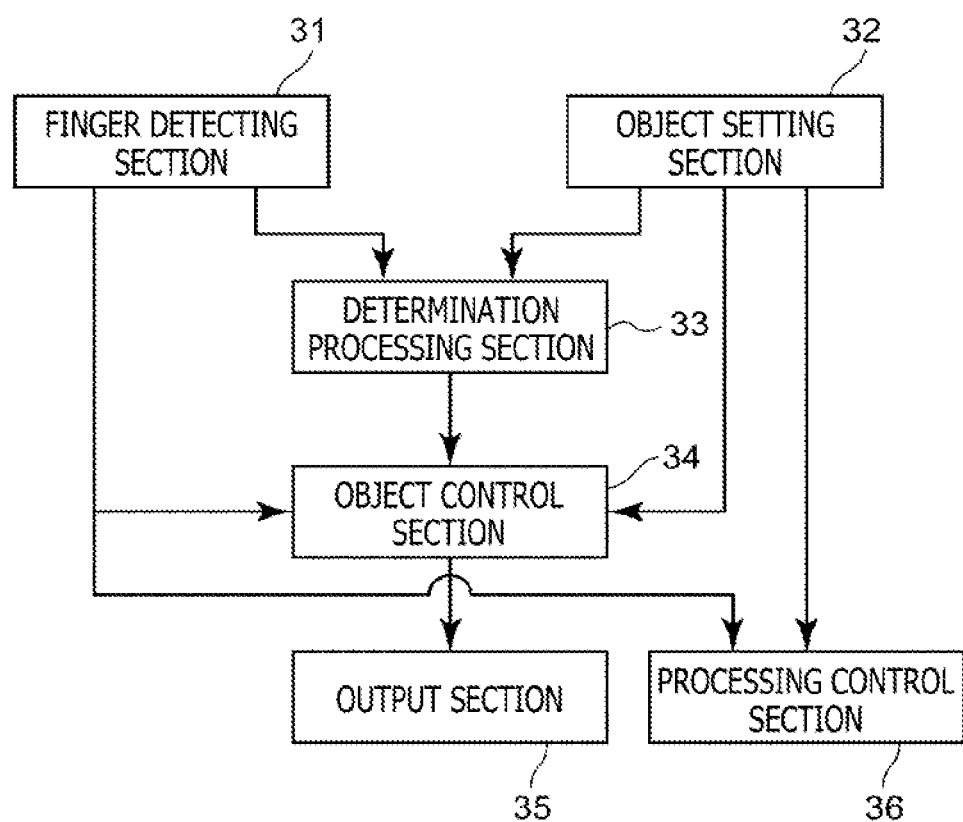
FIG. 3 is a functional block diagram depicting an example of the information processing device according to the embodiment of the present invention.

Operation of the control unit 11 of the information processing device 1 will be described in the following. As illustrated in FIG. 3 as an example, the control unit 11 according to the present embodiment includes a finger detecting section 31 an object setting section 32, a determination processing section 33, an object control section 34, an output section 35, and a processing control section 36.

Figure 4:
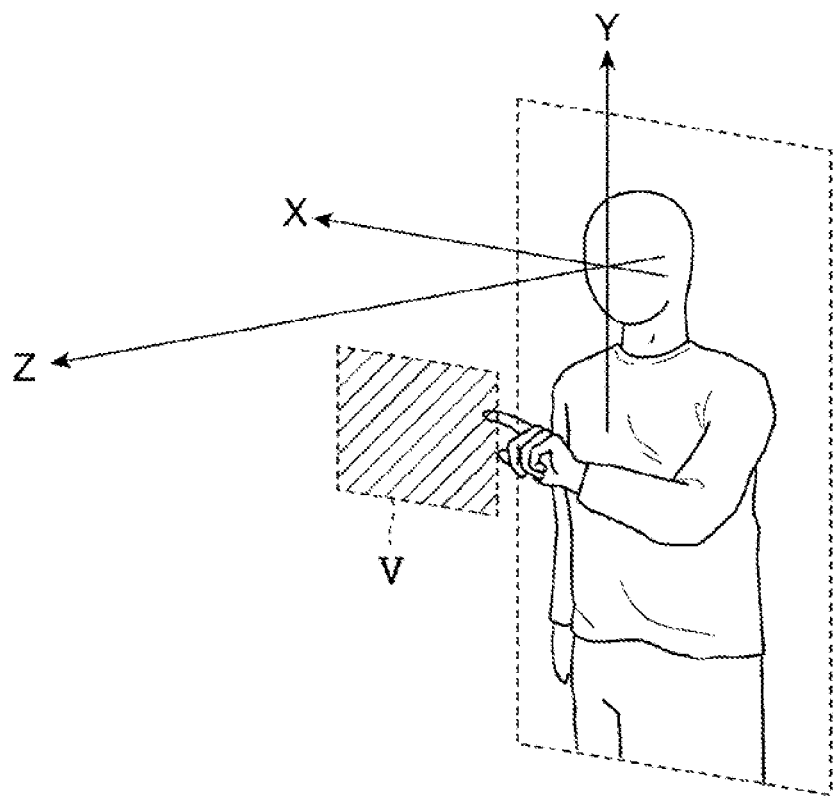
FIG. 4 is a diagram of assistance in explaining an example of a coordinate system used by the information processing device according to the embodiment of the present invention.

Here, the finger detecting section 31 obtains information regarding the position and orientation of each fingertip of the user in the real space. As an example, on the basis of the image data and the depth information received from the display device 2, the finger detecting section 31 according to the present embodiment, estimates the position of a finger from among objects imaged in the image data, and determines whether the finger is showing a back side (nail side) thereof or showing a pad side thereof as viewed from the user. Specifically, a variety of widely known methods including a method illustrated in V. I. Pavlovic, et. al., "Visual interpretation of hand gestures for human-computer interaction: a review," IEEE Transaction on Pattern Analysis and Machine Intelligence, Vol. 19, No. 7, pp. 677-695, 1997 can be adopted for the processing of detecting the position of a finger from an image by the finger detecting section 31. In addition, suppose that in the present embodiment, as illustrated in FIG. 4, the information processing device 1 expresses the position of the finger within the real space by using an orthogonal coordinate system having an axis present within a plane parallel with a coronal plane (coronal plane) of the user when the user is upright and parallel with a floor surface as an X-axis (the right side of the user is set as a positive direction), having an axis present within the plane parallel with the coronal plane of the user and parallel with a normal to the floor surface as a Y-axis (a vertically upward direction is set as a positive direction), and having a direction normal to the coronal plane of the user as a Z-axis (the front of the user is set as a positive direction). In this coordinate system, each point on coordinates (x, y, $\zeta$) ($\zeta$ is an arbitrary value) parallel with the Z-axis is visually recognized on a point T (x, y) in the X-Y orthogonal coordinate system of the field of view (two-dimensional field of view) of the user.

In addition, as an example of the processing of determining whether a finger is showing a back side (nail side) thereof or showing a pad side thereof, it suffices to perform processing of detecting nail portions of fingers (processing illustrated in, for example, Noriaki Fujishima, et. al., "Fingernail Detection Method from Hand Images including Palm," Proceedings of IAPR International Conference on Machine Vision Applications, pp. 117-120, 2013 or the like), determine that a finger whose corresponding image part is not recognised as a nail is showing a pad side of the finger among the fingers located at detected positions, and determine that a finger whose corresponding image part is recognized as a nail is showing a back side. In the present embodiment, the finger detecting section 31 implements obtaining means in the present invention.

The object setting section 32 sets a position and an image of a target virtual object within the virtual space. In an example of the present embodiment, the object setting section 32 disposes a sheet-shaped or polyhedral target virtual object within the virtual space according to an instruction output on the basis of the processing of an application program while the control unit 11 executes the application program. In addition, according to the instruction, the object setting section 32 makes a setting so as to display an image specified on the basis of the processing of the application program on a surface of the target virtual object which surface is displayed to the user side. Specifically, the instruction based on the application program includes information regarding the shape of user interface parts (virtual buttons or the like) and character strings to be displayed within the buttons or the like as well as the arrangement positions of the buttons or the like. According to this instruction, the object setting section 32 generates an image representing a user interface, and sets a texture of the surface of the target virtual object such that the image is displayed on the surface of the target virtual object. The processing of thus setting the image on the surface of the target virtual object is widely known, and therefore detailed description thereof will be omitted here.

In addition, the object setting section 32 sets the arrangement position of the target virtual object within the virtual space, the target virtual object having the image set on the surface thereof. In the present embodiment, as in the coordinate system of the real space illustrated in FIG. 4, the information processing device 1 sets the virtual space by using an orthogonal coordinate system having an axis present within a plane parallel with the coronal plane of the user when the user is upright and parallel with the floor surface as an X-axis (the right side of the user is set; as a positive direction), having an axis present within the plane parallel with the coronal plane of the user and parallel with the normal to the floor surface as a Y-axis (a vertically upward direction is set as a positive direction), and having a direction normal to the coronal plane of the user as a Z-axis (the front of the user is set as a positive direction). Incidentally, in order to make coordinate values in the real space and coordinate values in the virtual space coincide with each other, a ratio $\alpha$ in the X-axis direction, a ratio $\beta$ in the Y-axis direction, and a ratio $\gamma$ in the Z-axis direction in the coordinate system are obtained by calibration in advance. As an example, it suffices to perform processing for a plurality of coordinate points within the virtual space, the processing including displaying a point at known coordinates within the virtual space, instructing the user to touch this point by a fingertip, and obtaining a coordinate value in the real space, the coordinate value being detected by the finger detecting section 31 at a point in time that the user touches, and obtain a ratio of a distance between at least one predetermined pair of points within the virtual space to a distance between a pair of points in the real space which points correspond to the respective points within the virtual space.

Suppose that the object setting section 32 sets the position and shape of the target virtual object (FIG. 4: V) using coordinate values within this coordinate system. The setting of the disposition and shape of such a virtual three-dimensional object is also widely known, and therefore detailed description thereof will be omitted here.

The determination processing section 33 determines contact between the target virtual object set within the virtual space and a finger of the user. The determination of contact between the target virtual object and a finger of the user in the present embodiment is to determine the presence or absence of virtual contact between a finger of the user himself/herself in the real space which finger is visually recognized by the user through the display device 2 and the target virtual object in the virtual space which target virtual object is displayed so as to be superimposed on the finger. As a concrete example, the determination processing section 33 sets a virtual three-dimensional region including a region of an external shape of the target virtual object within the virtual space which target virtual object is set by the object setting section 32, and determines that the target virtual object and a finger of the user are in contact with each other when a coordinate value within the virtual space which coordinate value corresponds to the position of the finger in the real space, the finger being detected by the finger detecting section 31, is present within the three-dimensional region set here.

When there is a finger F determined by the determination processing section 33 to be a finger showing a back thereof among the fingers of the user and be in contact with the target virtual object set by the object setting section 32, the object control section 34 determines whether a part of the target virtual object which part corresponds to the finger F is present more to the user side than the finger F or more to the far side than the finger F. Here, when the part, of the target virtual object which part corresponds to the finger F is present more to the user side than the finger F, the object control section 34 sets the target virtual object in a partly deformed state so that the part is located more to the far side than the finger F (the part is recessed to the far side).

Figure 5:
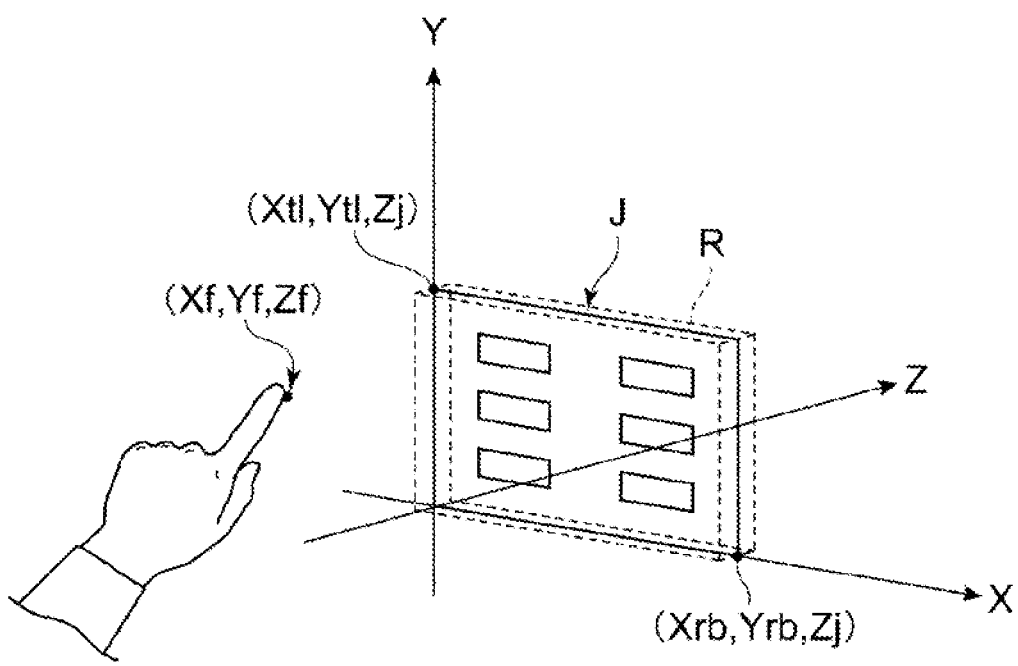
FIG. 5 is a diagram of assistance in explaining an example of a virtual object set by the information processing device according to the embodiment of the present invention.

As a concrete example, suppose that, as illustrated in FIG. 5, the object setting section 32 disposes a target virtual object J such that a normal to the surface of the object J is parallel with the 2-axis. Incidentally, suppose that this object is disposed at a position $Z=Zj$, that the shape of the object within an XY plane forms a rectangular shape, and that the coordinates of an upper left corner of the object, as viewed from the user side are (Xtl, Ytl) and the coordinates of a lower right corner of the object as viewed from the user side are (Xrb, Yrb). In addition, suppose that the thickness of the object J is substantially "0," and that the object J is thus substantially in a sheet shape.

The determination processing section 33 sets a virtual three-dimensional region R including the region of the external shape of the object J in the virtual sheet shape within the virtual space, the object J being set by the object setting section 32. As an example, suppose that the region R is a hexahedral region surrounded by a rectangular proximal side surface having (Xtl, Ytl, Zj−ΔZ) and (Xrb, Yrb, Zj−ΔZ) on a diagonal line thereof and a rectangular distal side surface having (Xtl, Ytl, Zj+ΔZ) and (Xrb, Yrb, Zj+ΔZ) on a diagonal line thereof.

Here, when position coordinates corresponding to the finger 7 of the user within the virtual space are (Xf, Yf, Zf) (the value in the Z-axis direction can be obtained from the depth information of the depth camera 24), and the finger F is showing a back (nail side) thereof to the user side, the determination processing section 33 determines whether or not the position coordinates (Xf, Yf, Zf) corresponding to the finger 7 within the virtual space which finger is determined to be showing the back (nail side) thereof to the user side are included in the set region R.

Then, the object control section 34 does not perform processing while the determination processing section 33 determines that the position coordinates (Xf, Yf, Zf) corresponding to the finger F within the virtual space are not included in the set region R. On the other hand, when the determination processing section 33 determines that the position coordinates (Xf, Yf, Zf) corresponding to the finger F within the virtual space are included in the set region R, a value on the Z-axis of the virtual sheet-shaped object J (which value is Zj irrespective of the X and Y coordinate values in this case) at the position of the position coordinates (Xf, Yf) of the finger F as viewed from the user side is compared with the value Zf on the Z-axis of the position coordinates of the finger F. Here, when Zf>Zj, the finger F is located more distant than the virtual sheet-shaped object J. Thus, in this case, the object control section 34 partly deforms the virtual sheet-shaped object J such that a region Rf of the virtual sheet-shaped object J within the X-Y plane in which region the finger F is displayed is located more to the distal side (far side with respect to the user) than the position of the corresponding finger F. This deformation can be performed by a publicly known method using terrain mapping (height map), for example, and therefore detailed description thereof will be omitted here.

The output section 35 renders the object within the virtual space which object is set by the object setting section 32 (and further deformed by the object control section 34 depending on conditions) as an image from a virtual camera virtually disposed at the position of an eye of the user (for example, the position of the imaging unit 23 of the display device 2), and sends out image data obtained as a result of the rendering to the display device 2.

The processing control section 36 performs processing determined in advance on the basis of the image displayed on the surface of the target virtual object and information regarding the position of the finger of the user. Specifically, when a change is made from a state in which the determination processing section 33 determines that the finger F determined to be showing the back side thereof is in contact with the target virtual object to a state in which the determination processing section 33 determines that the finger F determined to be showing the back side thereof is not in contact with the target virtual object, the processing control section 36 determines that a user interface part (virtual button or the like) present in an image part located at the position of the finger F and displayed on the surface of the target virtual object is depressed, and performs processing set in advance for the user interface part (for example, starting of a program or the like).

In addition, in the present embodiment, in a case where the user performs an operation of moving the finger while maintaining the state in which the determination processing section 33 determines that the finger F determined to be showing the back side thereof is in contact with the target virtual object, that is, when an operation such as a so-called swipe or pinch-in/pinch-out (an operation of changing a distance between two or more fingers is performed in a state in which the fingers are determined to be in contact) or the like is performed, the processing control section 36 performs processing specified by the application program or the like in advance in response to the operation of the swipe or the pinch-in/pinch-out while moving the position recessed to the far side to the position of the finger after the movement.

<Operation>

An example of the present embodiment has the above configuration, and operates as follows. The information processing device 1 according to the present embodiment executes an application program such, for example, as a game or the like, and performs processing of displaying a menu (image in which interface parts of selection items are arranged) within the virtual space during the execution of the application program.

At this time, according to an instruction of the application program, the information processing device 1 according to the present embodiment generates an image representing a user interface of the menu, and generates a texture of a surface of a virtual sheet-shaped object having the image set as the texture of the surface.

Then, the information processing device 1 disposes the virtual sheet-shaped object J in, for example, the coordinate system similar to that illustrated in FIG. 4 such that the normal to the surface of the object J is parallel with the Z-axis, as illustrated in FIG. 5. That is, the object J is disposed at a position Z=Zj. In addition, the shape of the object J within the XY plane forms a rectangular shape. Suppose that the coordinates of an upper left corner thereof as viewed from the user side are (Xtl, Ytl), and that the coordinates of a lower right corner thereof as viewed from the user side are (Xrb, Yrb). In addition, thickness in the Z-axis direction is substantially "0."

Here, the information processing device 1 renders the object J within the virtual space as an image from a virtual camera virtually arranged at the position of an eye of the user (for example, the position of the imaging unit 23 of the display device 2), and sends out image data obtained as a result of the rendering to the display device 2.

Figure 6:
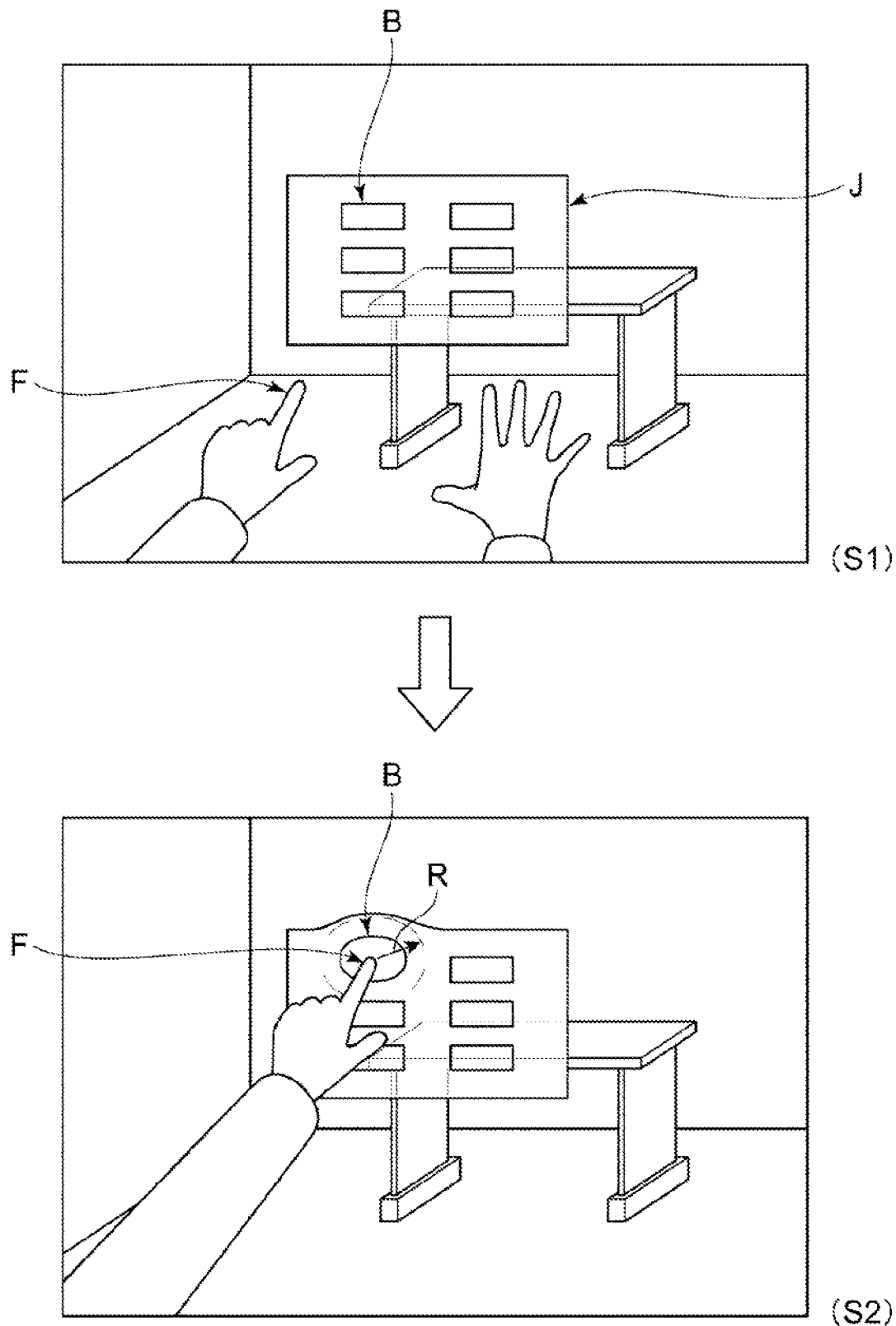
FIG. 6 is a diagram of assistance in explaining an example of an image displayed by the information processing device according to the embodiment of the present invention.

Then, the display device 2 (transparently) displays the result of the rendering in a state of being superimposed on an image of the real space in the same direction. Consequently, the user visually recognizes an image as depicted in FIG. 6 (S1).

Here, when the user reaches out a hand so that an index finger F of the user reaches the position Z=Zj in the virtual space, the user visually recognizes also the hand as an image within the real space. Suppose that in this state, the index finger F of the user is showing a back (nail side) thereof to the user side.

When the user reaches out the finger F to a button 5 on the object J displayed by the display device 2 in this state, the information processing device 1 recognizes the position of the finger F of the user (position of the fingertip of the finger F) and the orientation of the finger F (whether the finger F is showing the back side thereof to the user or showing the pad side thereof to the user) within the real space. Here, the information processing device 1 determines that the orientation of the finger F is the "back side."

Then, the information processing device 1 determines whether or not coordinates within the virtual space which coordinates correspond to the position of the fingertip of the finger F of the user within the real space are included within a virtual three-dimensional region R set in advance and including the region of the external shape of the virtual sheet-shaped object J (suppose that the region R is a hexahedral region surrounded by a rectangular proximal side surface having (Xtl, Ytl, Zj−ΔZ) and (Xrb, Yrb, Zj−ΔZ) on a diagonal line thereof and a rectangular distal side surface having (Xtl, Ytl, Zj+ΔZ) and (Xrb, Yrb, Zj+ΔZ) on a diagonal line thereof).

Specifically, when the coordinates within the virtual space which coordinates correspond to the position of the fingertip of the finger F of the user within the real space are (Xf, Yf, Zf), the information processing device 1 determines whether or not the following condition (referred to as a contact condition) is satisfied:

$$Xtl \leq Xf \leq Xrb \text{ and}$$

$$Ytl \leq Yf \leq Yrb \text{ and}$$

$$Zj-\Delta Z \leq Zf \leq Zj+\Delta Z$$

Here, when determining that the coordinates of the fingertip of the finger F showing the back side thereof satisfy the above contact condition, the information processing device 1 compares the value on the Z-axis of the virtual sheet-shaped object J (the value is Zj irrespective of the X and Y coordinate values in this case) located at the position of the position coordinates (Xf, Yf) of the finger F as viewed from the user side with the value Zf on the Z-axis of the position coordinates of the finger F.

Here, when Zf>Zj, the finger F is located more distant than the virtual sheet-shaped object J. Thus, the information processing device 1 partly deforms the virtual sheet-shaped object J such that the region Rf of the virtual sheet-shaped object J within the X-Y plane in which region the finger F is displayed is located more to the distal side (far side with respect to the user) than the position of the corresponding finger F. That is, in the object J, the value on the Z-axis of each point of the object J which point is located on a position at a radius r equal to or less than a predetermined R with the position of (Xf, Yf) as a center is set to be $Zj+z0(Zf-Zj) \cdot \exp(-r^2/R^2)$, where z0 is a constant that is empirically determined and equal to or more than "1." Then, a part at the predetermined radius R and less is deformed so as to be pushed in more to the far side than the position of the finger F as viewed from the user with the position of (Xf, Yf) on the object 3 as a center (S2). For the deformed shape, a bell-shaped function is used in this case, but there is no limitation to this.

During this processing, the information processing device 1 renders the object 3 within the virtual space as an image from a virtual camera virtually disposed at the position of an eye of the user (for example, the position of the imaging unit 23 of the display device 2), and sends out image data obtained as a result of the rendering to the display device 2. Then, the display device 2 (transparently) displays the result of the rendering in a state of being superimposed on an image of the real space in the same direction.

Incidentally, at this time, the information processing device 1 may perform control so as not to render a part of the virtual sheet-shaped object J on which part the finger of the hand of the user is superimposed by masking the part of the virtual sheet-shaped object J. Thus, it is possible to clearly indicate to the user that an interface part such as a button or the like on the object J is operated, and an unnatural rendering due to penetration of the finger through the object J is prevented.

The information processing device 1 further identifies an interface part such as a button or the like on the object J, the interface part being located at the position corresponding to the (X, Y) coordinates of the fingertip of the finger F when the coordinates of the fingertip of the finger F no longer satisfy the contact condition from here. Then, when there is such an identified interface part, processing is performed which processing is determined in advance on the application program side as processing to be performed when the user operates the interface part.

<Example of Moving Position of Object>

Incidentally, the description thus far supposes that a part of the target virtual object is deformed such that the part of the target virtual object which part corresponds to the position of the finger is located more distant than the position of the finger of the user to prevent the finger of the user from penetrating the target virtual object displayed by the display device 2. However, the present embodiment is not limited to this.

For example, when there is a finger F that is showing the back thereof among the fingers of the user and determined by the determination processing section 33 to be in contact with the target virtual object set by the object setting section 32, the object control section 34 determines whether the part of the target virtual object which part corresponds to the finger F is located more to the user side than the finger F or located more to the far side than the finger F. When determining that the part of the target virtual object which part corresponds to the finger F is located more to the user side than the finger F, the object control section 34 may translate the position of the whole of the target virtual object in the Z-axis direction, and thereby make a setting such that the part of the target virtual object more distant than the finger F which part corresponds to the finger F is located more to the far side than the finger F.

Further, in an example of the present embodiment, the information processing device 1 may compare the value on the Z-axis of the target virtual object J (which value is assumed to be (Zj(Xf, Yf))) located at the position of the position coordinates (Xf, Yf) of the finger F as viewed from the user side with the value Zf on the Z-axis of the position coordinates of the finger F when the coordinates of the fingertip of the finger F showing the back side thereof are determined to satisfy the above-described contact condition. In a case where Zth>Zf−Zj(Xf, Yf)>0, the information processing device 1 may deform a part of the target virtual object such that the part of the target virtual object which part corresponds to the position of the finger is located more distant than the position of the finger of the user. In a case where Zf−Zj(Xf, Yf)≥Zth, the information processing device 1 may translate the position of the whole of the target virtual object in the Z-axis direction, and thereby make a setting such that the part of the target virtual object more distant than the finger F which part corresponds to the finger F is located more to the far side than the finger F. Incidentally, here, Zth is a threshold value set in advance (Zth>0).

In the present example, while the finger of the user is located farther than the original position on the Z-axis of the object J by less than Zth, a part of the object J is deformed and the object J is thus displayed as if the object J is partly pushed in. When the finger further continues to be moved farther so as to exceed Zth, the whole of the object J is moved, and thus it becomes possible to perform an operation of moving the object J in the Z-axis direction. In the case where the whole of the object J is thus moved, the information processing device 1 may not perform any operation on an interface part present at the corresponding position even when the coordinates of the fingertip of the user thereafter no longer satisfy the contact condition.

<Masking Object>

In addition, in the present embodiment, when the information processing device 1 refers to the depth information output by the display device 2, and the finger of the hand of the user is present more to the near side than a point (x, y, Zj(x, y)) on the target virtual object J, that is, when a value Zv on the Z-axis in the virtual space which value corresponds to a distance on the Z-axis to an object in the real space at the point (x, y) within the field of view, the distance being indicated by the depth information, is such that $Zj(x, y) > Zv$, the information processing device 1 may not render an image at the position $(x, y)$ of the object J by masking the image. It is thereby possible to represent a state in which an object is hidden by an object present on the near side.

<Finger Showing Pad Side>

In addition, when the finger F of the user which finger is showing the pad side thereof (opposite side from the nail) is located more to the far side than the point $(x, y, Zj(x, y))$ on the target virtual object J, that is, when a component Zf in the Z-axis direction of the position of the fingertip of the finger F is $Zf > Zj(x, y)$, the information processing device 1 according to the present embodiment may perform control so as not to mask the rendering of the object J at the position corresponding to the finger F of the user. In this case, the display device 2 presents, to the user, the corresponding part of the object J in a state of being semitransparently synthesized with an image of the finger of the user himself/herself which finger is showing the pad side to the user.

Incidentally, in this processing, as the point $(x, y, Zj(x, y))$ on the target virtual object J when determining whether or not the component Zf in the Z-axis direction of the position of the fingertip of the finger F is $Zf > Zj(x, y)$, a coordinate value before deformation may be used even when the target virtual object J is displayed so as to be partly deformed according to the position of another finger showing the back thereof.

<Recognition of Plurality of Fingers>

Further, in the present embodiment, the information processing device 1 recognizes each of the positions and orientations of a plurality of fingers of the user. Further, the information processing device 1 according to the present embodiment may obtain information regarding the positions and orientations (whether the back side is depicted to the user or whether the pad side is depicted to the user) of fingers of each of the left and right hands of the user.

The information processing device 1 in the present example successively obtains coordinate values in the XYZ coordinate system in the virtual space which coordinate values correspond to the positions of respective fingers FL1 to FL5 of the left hand of the user in the real space and information regarding the orientations of the respective fingers. In addition, similarly, the information processing device 1 successively obtains coordinate values in the XYZ coordinate system in the virtual space which coordinate values correspond to the positions of respective fingers FR1 to FR5 of the right hand of the user and information regarding the orientations of the respective fingers in the real space. The information processing device 1 then determines whether or not each of the fingers is in contact with the target virtual object.

In addition, for example, when a first finger F1 determined to be showing the pad side thereof and a second finger F2 determined to be showing the back side thereof are both in contact with the target virtual object, and a distance between the coordinate value $(x1, y1, z1)$ of the fingertip of the finger F1 in the XYZ coordinate system in the virtual space and the coordinate value $(x2, y2, z2)$ of the fingertip of the finger F2 in the XYZ coordinate system in the virtual space is less than a threshold value set in advance (at this time, a part of the target virtual object which part corresponds to the finger F2 showing the back side thereof is deformed so as to be more to the far side than the finger F2, but is rendered in a state of being semitransparently synthesized with the finger F1 because the coordinate value of the part of the target virtual object before the deformation is compared in position comparison in the Z-axis direction with the finger F1 showing the pad side thereof), the information processing device 1 may determine that the target virtual object is virtually sandwiched between these fingers at the positions of the fingers F1 and F2 (in a predetermined range including $(x1, y1)$ and $(x2, y2)$, for example, the range of a minimum circle including $(x1, y1)$ and $(x2, y2)$), and perform predetermined processing.

For example, when the user moves the fingers F1 and F2 in a state in which it is determined that the target virtual object is virtually sandwiched between the fingers F1 and F2, the whole of the target virtual object may be translated within the virtual space according to an amount of movement of the fingers F1 and F2. As an example, when it is recognized that the finger F1 is moved from $(x1, y1, z1)$ to $(x1+\Delta x1, y1+\Delta y1, z1+\Delta z1)$, the information processing device 1 translates the arrangement position of the target virtual object within the virtual space by $\Delta x1$ in the X-axis direction, by $\Delta y1$ in the Y-axis direction, and by $\Delta z1$ in the Z-axis direction.

In addition, in a state in which the target virtual object is determined to be sandwiched at a plurality of positions P1 and P2 (generally, the target virtual object is determined to be sandwiched between a plurality of fingers of fingers FL1 to FL5 of the left hand at one position P1, and the target virtual object is determined to be sandwiched between a plurality of fingers of fingers FR1 to FR5 of the right hand at the other position P2), when a distance between one finger Fp1 determined to be virtually sandwiching the target virtual object at the position P1 and one finger Fp2 determined to be virtually sandwiching the target virtual object at the position P2 changes, the size of the target virtual object within the virtual space may be changed according to the change in the distance. For example, when it is recognized that the distance is changed from an original distance L by $L+\Delta L$, the information processing device 1 enlarges the size of the target virtual object by a factor of $(L+\Delta L)/L$.

Figure 7:
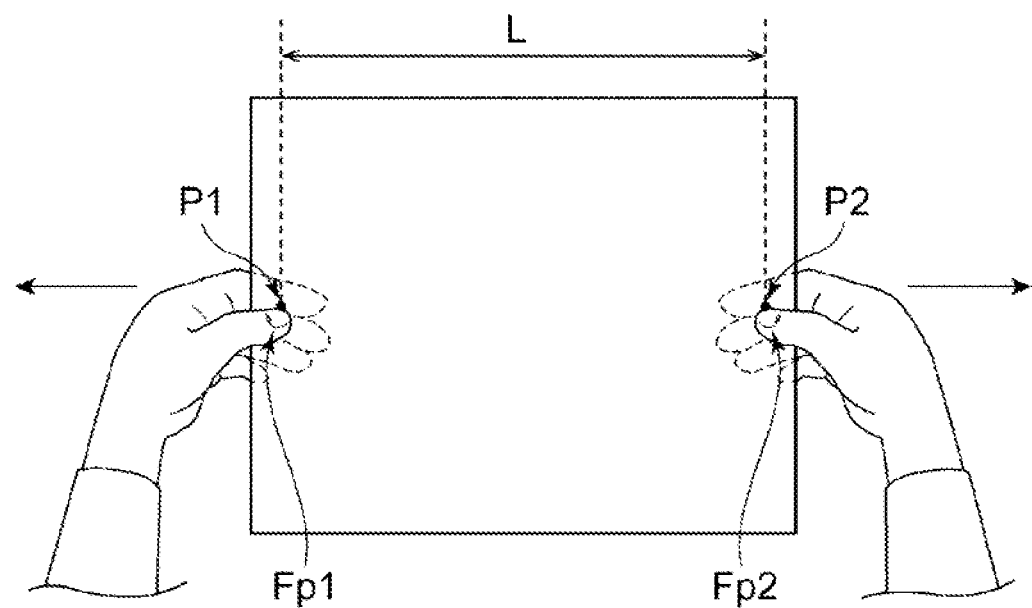
FIG. 7 is a diagram of assistance in explaining another example of the virtual object set by the information processing device according to the embodiment of the present invention.

In the present example, as depicted in FIG. 7, when both hands are each moved so as to be separated from each other (in directions of arrows in the figure) in a state in which both end portions of the target virtual object are held by both hands, the information processing device 1 recognizes the movements of the hands, and performs control to enlarge the target virtual object within the virtual space.

Further, when there are a plurality of fingers determined to be in contact with the target virtual object and each orientated in the same direction (showing either the back side or the pad side thereof), the information processing device 1 may perform processing assuming that an operation of moving the target virtual object is performed in a direction of movement of the plurality of fingers. In addition, when an interval between the plurality of fingers is increased or reduced, it may be determined that an operation of enlarging or reducing the image displayed on the surface of the target virtual object (texture set on the surface of the target virtual object) is performed, and corresponding processing may be performed.

<Pasting onto Object in Real Space>

In addition, the information processing device 1 according to the present embodiment may recognize not only the fingers of the hands of the user but also the position and range of a surface of a wall, a desk, or the like disposed in the real space. For the processing of recognizing such a flat surface, a widely known method such as determination processing using the depth information output by the display device 2 or the like can be adopted.

In a case where an operation of moving the target virtual object is performed, and the target virtual object is determined to be in contact with one of recognized flat surfaces, the information processing device 1 may determine that the target virtual object is "pasted" to the position of the flat surface, and stop moving the target virtual object at a point in time of the determination.

Incidentally, in the present example, in the case where the operation of moving the target virtual object is performed, and the target virtual object is determined to be in contact with one of the recognized flat surfaces, the information processing device 1 may determine that the target virtual object is "pasted" to the position of the flat surface, and stop moving the target virtual object at the point in time of the determination only when the whole of the target virtual object within the field of view is in a state of being included in the recognized flat surface (the whole of the target virtual object is in a state of being superimposed on the recognized flat surface).

This prevents the target virtual object from being "pasted" to a flat surface narrower or smaller than the target virtual object.

In this case, when the user performs an operation of moving a finger from the periphery of the target virtual object to the inside of the target virtual object, for example, it may be determined that the target virtual object is in a state of being "peeled off," and an animation such that the target virtual object is peeled off may be displayed. Thereafter, the display of the target virtual object may be stopped, or the target virtual object may be controlled such that an operation of moving the target virtual object is allowed to be performed again from a position at which the target virtual object is peeled off.

Incidentally, when the target virtual object is pasted, the information processing device 1 stops the processing of partially deforming the target virtual object irrespective of the position of the finger of the user (irrespective of whether or not the finger of the user is determined to be in contact). This inhibits the target virtual object from being deformed more to the far side than the flat surface to which the target virtual object is pasted.

<Recognition of Side Surface of Finger>

The information processing device 1 according to the present embodiment may further recognize a side surface of a finger of the user from the image data obtained by imaging by the display device 2. In a case where the information processing device 1 recognizes a side surface of a finger of the user, when a region including the side surface of the finger is moving in the direction of the center of the target virtual object while in contact with one side of the perimeter of the target virtual object (when the region including the side surface of the finger is in contact with the left side of the target virtual object, and is further moving to the right side, for example), the information processing device 1 may translate the target virtual object according to the movement of the region including the side surface of the finger.

As an example, the information processing device 1 in this case repeatedly obtains the center of gravity of the region including the side surface of the finger during a period during which the region including the side surface of the finger is moving in the direction of the center of the target virtual object while in contact with one side of the perimeter of the target virtual object. When the center of gravity moves by ($\Delta x$, $\Delta y$) within the XY plane, the information processing device 1 translates the target virtual object that the region including the side surface of the finger is in contact with by ($\Delta x$, $\Delta y$) within the XY plane.

Further, in a certain example of the present embodiment, the display of the target virtual object may be stopped when the magnitude $(\Sigma \Delta x)^2 + (\Sigma \Delta y)^2$ of a cumulative amount of movement ($\Sigma \Delta x$, $\Sigma \Delta y$) from a point in time that the region including the side surface of the finger is determined to be in contact with the perimeter of the target virtual object exceeds a threshold value set in advance.

<Instruction to Start Display of Object>

Further, the information processing device 1 according to the present embodiment may control display of the target virtual object and stopping of the display of the target virtual object and control display modes according to a pose (state of each finger) of a hand of the user.

As an example, the information processing device 1 starts display of a target virtual object set in advance when determining that the user clenches a hand. At this time, the information processing device 1 displays the target virtual object within a predetermined distance range of a region in which the hand clenched by the user is visually recognized by the user. Hence, in this case, when the user moves the clenched hand, the information processing device 1 moves the position of the target virtual object within the virtual space by an amount of movement within the virtual space which amount corresponds to an amount of the movement of the clenched hand (amount of the movement of the clenched hand in the real space).

In addition, the information processing device 1 may detect the strength of the clenching of the hand. Specifically, in this case, a device (not depicted) that recognizes the strength of the clenching of the hand of the user may be made to be worn, an output signal of the device may be received via the communicating unit 13 by wireless, and the strength of the clenching of the hand of the user may be detected on the basis of the received output signal. In this case, the information processing device 1 may, for example, perform processing of increasing the size of the displayed target virtual object as the strength of the clenching of the hand is increased.

Further, in the present example, the information processing device 1 may display the target virtual object only for a duration of clenching the hand. In the case where user interface parts are arranged on the surface of the target virtual object as already described, instruction input using the user interface is possible only when the user clenches the hand in the present example.

Further, in this case, when the user virtually sandwiches the target virtual object between fingers and moves the target virtual object after the target virtual object is displayed in the state in which the user clenches the hand, the display of the target virtual object may not be stopped even if the user thereafter opens the hand.

In this processing, while the target virtual object is displayed in the state in which the hand is clenched, a "movement mode" is set, and the target virtual object is displayed in the vicinity of a predetermined part (for example, an arm in this case) of the user. The information processing device 1 moves the target virtual object according to a movement of the arm as an example of the predetermined part of the user. In addition, when the target virtual object displayed in the "movement mode" is virtually sandwiched between fingers and moved, an "aerial mode" is set in which the target virtual object is displayed in a state of staying at a position to which the target virtual object is moved. In the "aerial mode," the information processing device 1 does not stop the display of the target virtual object even when detecting that the user has opened the hand. In addition, in the "aerial mode," the information processing device 1 may perform control so as not to move the position of the target virtual object within the virtual space, without following the movement of the arm as an example of the predetermined part of the user.

Further, by the processing of the information processing device 1, the target virtual object in the "aerial mode" may be allowed to be moved by the user by virtually pushing a side surface of the target virtual object by a finger or by virtually sandwiching the target virtual object between fingers, as already described. When the target virtual object is thus moved, and moved to the position of the flat surface of a desk or the like in the real space, for example, the target virtual object may be displayed in a state of being virtually pasted to the flat surface (paste mode).

<Instruction to be Stationary in the Air>

Further, in an example of the present embodiment, when the user performs an operation of changing the relative positions of a plurality of target virtual objects (for example, an operation of moving one target virtual object to the position of another target virtual object), the information processing device 1 may perform predetermined processing for the plurality of target virtual objects.

For example, when the information processing device 1 displays a virtual thumbtack object Jp as a target virtual object in the virtual space and meanwhile displays a virtual sheet-shaped object J as another target virtual object in the virtual space, and when the user performs an operation of moving the thumbtack object Jp to a position (position within the virtual space) superimposed on the sheet-shaped object J and completing the movement there (for example, an operation of pushing in the thumbtack object Jp away from the user), the information processing device 1 may perform control such that the virtual sheet-shaped object J is not moved by a subsequent operation from the position where the operation is performed.

This control can be realized by, for example, making the information processing device 1 perform no processing at all in response to an operation for moving the virtual sheet-shaped object J by the user when the operation is performed.

In addition, in this case, when the user moves the thumbtack object Jp from the position superimposed on the sheet-shaped object J to a position not superimposed on the sheet-shaped object J, the virtual sheet-shaped object J may be thereafter controlled to be movable by an operation of the user.

<Pop-Up Window>

In addition, in an example of the present embodiment, the information processing device 1 may generate and display another target virtual object in a state of being superimposed on a target virtual object.

At this time, for example, there is a case where the other target virtual object is displayed like a so-called pop-up window so as to be superimposed on the certain target virtual object in a state in which a finger of the user is depressing a button displayed on the certain target virtual object (at this time, a corresponding button part on the target virtual object is controlled to be displayed in a state of being deformed so as to be recessed to the far side).

At this time, even when a finger of the user is superimposed on the other target virtual object, the information processing device 1 may perform control so as not to move the other target virtual object more to the far side than the finger of the user until the finger of the user is once moved to the outside of the other target virtual object (position not superimposed on the other target virtual object in the rendered field of view). Such control can be realized by, for example, associating a flag indicating whether or not the finger of the user is once moved to the position not superimposed on the newly generated target virtual object, and performing control so as not to move the other target virtual object more to the far side than the finger of the user while the flag is not in a state of indicating that the finger of the user is once moved to the position not superimposed on the other target virtual object.

Incidentally, when the user does not move the finger to the outside of the other target virtual object, but moves the finger more to the near side than a position within the real space which position corresponds to a position where the other target virtual object is displayed within the virtual space, an animation in which the other target virtual object is deformed may be displayed so as to avoid the finger. When the other target virtual object is a sheet-shaped object, for example, it suffices to make display as if the finger of the user moved to the near side while lifting the target virtual object by displaying an animation such that a sheet is turned up.

In this case, at a point in time that the user moves the finger more to the near side than the target virtual object, it may be assumed that the finger of the user is once moved to the position not superimposed on the target virtual object, and subsequent processing may be performed.

<Shape of Virtual Object>

Further, the shape of the target virtual object displayed by the information processing device 1 here is not limited to a sheet shape or a rectangular parallelepipedic shape. For example, the target virtual object J may form a tubular shape, and images of user interface parts may be successively arranged on the surface of the tubular shape, as illustrated in FIG. 8.

Figure 8:
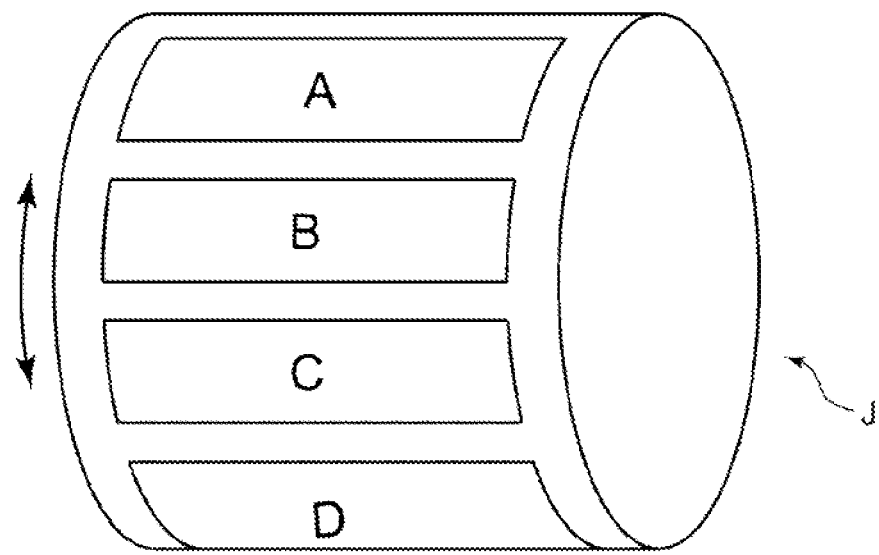
FIG. 8 is a diagram of assistance in explaining yet another example of the virtual object set by the information processing device according to the embodiment of the present invention.

In the present example, when the user is, for example, determined to perform an operation of virtually stroking the surface of the target virtual object J in one direction with two fingers, the information processing device 1 may rotate and move the target virtual object J in the stroking direction, that is, in the direction of an arrow in FIG. 8 with the center of a cylinder as a rotational center. This enables the user to access a user interface part disposed in a part made visually recognizable by the user by the rotation after the target virtual object having the tubular body is rotated.

<Display of Contact State>

In addition, the information processing device 1 may set display modes of the target virtual object such that the display mode of the target virtual object in a state in which the target virtual object within the virtual space and the finger of the user are in contact with each other is different from the display mode of the target virtual object in a state in which the target virtual object within the virtual space and the finger of the user are not in contact with each other.

As an example, the information processing device 1 changes the color of an outer peripheral edge portion (contour line) of the target virtual object between the state in which the finger of the user is in contact and the state in which the finger of the user is not in contact.

In addition, in a case where the user wears a device that can present a tactile force sense to a hand or the like, the information processing device 1 may instruct the device to present a tactile force sense set in advance when the target virtual object within the virtual space and the finger of the user come into contact with each other or when the state in which the finger of the user is in contact is maintained.

The user can thereby obtain feedback by the tactile force sense when the target virtual object within the virtual space and the finger of the user come into contact with each other, for example.

<Limitation of Movement>

Further, in an example of the present embodiment, the information processing device 1 may identify the position and shape of an object (real object) such as a wall surface, a desk, or the like within the real space (this method is widely known, and therefore detailed description will be omitted here), and dispose a corresponding virtual object (corresponding object) at a corresponding position (dispose the corresponding virtual object such that a relative position thereof from the user coincides) within the virtual space.

In this case, while the user is moving the target virtual object, contact may be determined between the target virtual object being moved and the corresponding object within the virtual space, and control may be performed so as not to move the target virtual object to a position where the target virtual object being moved and the corresponding object are determined to come into contact with each other.

Incidentally, the shape of the corresponding object in the present example does not necessarily have to conform to the shape of the corresponding real object within the real space, but a rectangular parallelepiped circumscribing the real object, for example, may be set as the shape of the corresponding object within the virtual space.

REFERENCE SIGNS LIST

1 Information processing device, 2 Display device, 11 Control unit, 12 Storage unit, 13 Communicating unit, 21 Control unit, 22 Communicating unit, 23 Imaging unit, 24 Depth camera, 25 Display unit, 31 Finger detecting section, 32 Object setting section, 33 Determination processing section, 34 Object control section, 35 Output section, 36 Processing control section.

The invention claimed is:

1. An information processing device connected to a display device presenting an image of a virtual space to a user, the information processing device comprising:
   obtaining means for obtaining information regarding a position of each fingertip of the user in a real space;
   object setting means for setting a position and an image of a virtual object within the virtual space;
   determining means for determining contact between the virtual object set within the virtual space and a finger of the user; and
   shape setting means for setting the virtual object in a partly deformed state such that a part of the virtual object, the part corresponding to a position of the finger determined to be in contact with the object among fingers of the user, is located more to a far side from a user side than the finger;
   the virtual object having the shape set to the virtual object being displayed as an image in the virtual space on the display device; and
   means for recognizing a flat surface within the real space,
   wherein the object setting means performs processing in a paste mode in which the position of the virtual object is set at a position pasted to the flat surface according to an instruction of the user.

2. The information processing device according to claim 1, wherein
   the object setting means sets the position of the virtual object in the virtual space such that the virtual object is located more to the far side than the finger determined to be in contact with the object among the fingers of the user.

3. The information processing device according to claim 1, wherein
   the object setting means sets the virtual object such that a contour line in a first color of the virtual object is displayed when the determining means determines that the virtual object and one of the fingers of the user are in contact with each other and the contour line is displayed in a second color when the determining means determines that none of the fingers is in contact with the virtual object.

4. The information processing device according to claim 1, wherein
   the object setting means performs processing in a movement mode in which the position of the virtual object is moved by an amount of movement within the virtual space, the amount of movement singularly corresponding to an amount of movement of a predetermined part of the user in the real space, according to an instruction of the user,
   wherein the predetermined part of the user is a clenched first of the user, and
   wherein the processing in the movement mode stops then the clenched first is unclenched.

5. The information processing device according to claim 1, wherein
   the object setting means performs processing in an aerial mode in which the position of the virtual object is not moved irrespective of movement of a predetermined part of the user in the real space according to an instruction of the user.

6. The information processing device according to claim 4, wherein
   the object setting means performs processing in a plurality of modes including the movement mode, and when a predetermined operation is performed in each mode, the object setting means switches to processing in another mode and performs processing,
   wherein the predetermined operation is changing a size of the virtual object, and
   wherein a size of a clenched fist made by the user singularly determines the size of the virtual object.

7. The information processing device according to claim 1, wherein
   the obtaining means further obtains orientation information indicating whether each finger of the user is showing a back or showing a pad, and
   the shape setting means sets the virtual object in the partly deformed state such that the part of the virtual object, the part corresponding to the position of the finger showing the back and determined to be in contact with the object among the fingers of the user, is located more to the far side from the user side than the finger.

8. The information processing device according to claim 7, wherein
   the virtual object is further rendered in a state of being superimposed on a finger showing the pad among the fingers of the user.

9. A control method of an information processing device, the control method being performed by using a computer connected to a display device presenting an image of a virtual space to a user, the control method comprising:
   obtaining information regarding a position of each fingertip of the user in a real space;
   setting a position and an image of a virtual object within the virtual space;
   determining contact between the virtual object set within the virtual space and a finger of the user;
   setting the virtual object in a partly deformed state such that a part of the virtual object, the part corresponding to a position of the finger determined to be in contact with the object among fingers of the user, is located more to a far side from a user side than the finger; and displaying the virtual object having the shape set to the virtual object as an image in the virtual space on the display device;

recognizing a flat surface within the real space; and processing in a paste mode in which the position of the virtual object is set at a position pasted to the flat surface according to an instruction of the user.

10. A non-transitory computer readable medium having stored thereon a program for a computer connected to a display device presenting an image of a virtual space to a user, the program comprising:

obtaining means for obtaining information regarding a position of each fingertip of the user in a real space;

object setting means for setting a position and an image of a virtual object within the virtual space;

determining means for determining contact between the virtual object set within the virtual space and a finger of the user;

shape setting means for setting the virtual object in a partly deformed state such that a part of the virtual object, the part corresponding to a position of the finger determined to be in contact with the object among fingers of the user, is located more to a far side from a user side than the finger;

means for displaying the virtual object having the shape set to the virtual object as an image in the virtual space on the display device; and means for recognizing a flat surface within the real space, wherein the object setting means performs processing in a paste mode in which the position of the virtual object is set at a position pasted to the flat surface according to an instruction of the user.

* * * * *